United States Patent [19]

Merritt

[11] Patent Number: 5,060,609
[45] Date of Patent: Oct. 29, 1991

[54] INTERNAL COMBUSTION ENGINE

[76] Inventor: Dan Merritt, 139 Baginton Road, Coventry, England

[21] Appl. No.: 622,752

[22] Filed: Dec. 5, 1990

[30] Foreign Application Priority Data

Dec. 6, 1989 [GB] United Kingdom ............. 8927617
Jan. 31, 1990 [GB] United Kingdom ............. 9002177
Feb. 8, 1990 [GB] United Kingdom ............. 9002871

[51] Int. Cl.$^5$ .................. F02B 19/04; F02B 19/08
[52] U.S. Cl. ................... 123/256; 123/263; 123/269; 123/279; 123/290
[58] Field of Search ............ 123/256, 257, 260, 261, 123/263, 269, 279, 286, 289, 290, 291, 293

[56] References Cited

U.S. PATENT DOCUMENTS

| 4,378,764 | 4/1983 | Jorgensen | 123/290 X |
| 5,009,207 | 4/1991 | Merritt | 123/263 X |

FOREIGN PATENT DOCUMENTS

| 0015982 | 5/1912 | Denmark | 123/291 |
| 0034347 | 5/1929 | France | 123/291 |
| 0836074 | 1/1939 | France | 123/290 |
| 0847467 | 10/1939 | France | 123/290 |

Primary Examiner—Willis R. Wolfe
Attorney, Agent, or Firm—Charles A. Brown

[57] ABSTRACT

An internal combustion engine has first and second cylinders (12, 14), the first cylinder (12) having a larger swept volume than the second cylinder (14) and the second cylinder being formed in the crown of the first cylinder. First and second pistons (16, 18) are reciprocable respectively in the first and second cylinders (12, 14), the second piston (18) being formed as a protrusion on the crown of the first piston (16). A combustion chamber (20) is formed in the second piston (18) with an air port (44) opening into the first cylinder (12) and a second port (40) opening into the second cylinder (14). A first inlet is provided (25) for supplying air or the like into the first cylinder (12) during an induction stroke of the first piston (16) together with a fuel inlet (36) for supplying fuel to said second cylinder (14). A passage extends between the first and second cylinder to enable transfer of air from said first cylinder (12) to said second cylinder (14) other than through said combustion chamber (20) over a preselected angle of movement of the pistons relative to the cylinders for assisting movement of gases from said second cylinder (14) into said combustion chamber (20). Additional control means for controlling the movement of air is also provided.

39 Claims, 5 Drawing Sheets

INTERNAL COMBUSTION ENGINE

The present invention relates to internal combustion engines.

An internal combustion engine system can be subdivided into a number of inter-related sub-systems which operate together to bring about a desired performance in relation to speed, power output, fuel consumption and exhaust emission of the engine system. These subdivisions are:

(a) ignition means (b) management of fuel input (c) management of gas flow inside the engine cylinders and combustion chamber.

The diesel engine system has the following capabilities (d) segregation of fuel from air prior to combustion (e) mixing of fuel and air in a combustion chamber during combustion.

Segregation is the term used to describe the exclusion of fuel from the combustion chamber of the engine during the induction and compression strokes of the engine to prevent premature ignition when a continually operable ignition means is situated in the combustion chamber. Segregation confers a consideration fuel efficiency benefit on an internal combustion engine for the following reasons:

(i) The engine compression ratio can be chosen without regard to the fuel used since spontaneous ignition by compression can be prevented, (ii) at partial load, the fuel input can be reduced without a deliberate reduction in air input. This results in an "ultra lean burn" operation of the engine, (iii) at partial load there is also no need for any mechanical interference with the airflow during induction of the air, as is effected, for example, by a throttle valve which leads to pumping losses.

The diesel engine is the only internal combustion engine currently available which uses segregation in its operation. During operation, air is drawn into a cylinder of the engine and is compressed to a high volume ration (14:1 to 25:1) as a result of which the air reaches a high temperature of between 300° C. and 400° C. Fuel is not injected into the cylinder until the end of the compression stroke. Because of the high temperature of the air, the fuel ignites spontaneously. However, ignition does not take place immediately the fuel is injected. The fuel enters the cylinder in the form of liquid droplets. These must mix intimately with the air in the cylinder and vaporise before they can ignite to commence combustion. This inherent delay in combustion renders the combustion process a relatively slow process which limits the efficient operation of the diesel engine to relatively low speeds. The segregation referred to above is effected mechanically in the diesel engine by the fuel injection pump the injector needle of which mechanically segregates the fuel from the cylinder or combustion chamber until the moment of injection.

The present invention seeks to provide an improved internal combustion engine.

An internal combustion engine according to the present invention relies on the movement of gases between two cylinders of unequal swept volume, interconnected by a common combustion chamber where ignition takes place, to promote segregation. It has been established than when both pistons of the engine move towards their inner dead centre positions gas flows from the larger cylinder, through the combustion chamber and into the smaller cylinder during most of the compression stroke. Fuel is introduced into the smaller cylinder during the induction stroke of the latter and/or a first part of the compression stroke up to the piston position at which the gas flow reverses and the content of the smaller cylinder enters the combustion chamber. Liquid fuel can be introduced into the smaller cylinder commencing over any part or all of the stroke movement of the second cylinder's piston from the inner dead centre (IDC) position of the second piston at the start of the induction stroke to not less than 10% prior to the inner dead centre position at the end of the compression stroke, over the full range of fuelling conditions from full load to idling, and ending no later than the inner dead centre position at the end of the compression stroke.

It will be appreciated that references herein to angles of movement of the pistons do in fact refer to crankshaft angles of rotation equivalent to axial movement of the pistons.

The introduction of liquid fuel into the smaller cylinder during a preselected part of the cycle prior to ignition allows the fuel time to vaporise into gas in the smaller cylinder so that when it enters the combustion chamber to ignite, the combustion process which follows involves gaseous fuel and is much more rapid in comparison with the combustion process in the diesel engine. This allows the engine according to the present invention to operate efficiently at much higher speeds than is possible with the diesel engine. In effect, the engine according to the present invention combines the efficiency of the diesel engine as a segregation engine with the high speed capability of the gasoline engine.

A number of features in a preferred form of the invention contribute to effective segregation, these being:

(a) a combination of a large swept volume cylinder containing air only (or air with such a small quantity of fuel as to render it unignitable by the ignition means in the combustion chamber, the upper limit of any such fuel/air mixture ratio being below the lower (lean) flammability limit for such a mixture) with a smaller swept volume cylinder into which the fuel is introduced. The two cylinders are interconnected by a common combustion chamber.

(b) The introduction of fuel into the smaller cylinder in liquid form cools the gases in the smaller cylinder by evaporation, so lowering the pressure there in relation to the pressure in the larger cylinder at any given piston positions during the compression stroke up to a final part of the compression stroke. This effectively promotes a flow of gas from the larger cylinder through the combustion chamber to the smaller cylinder.

(c) An optional feature is that the phase difference between the positions of the pistons in the larger and smaller cylinders can be chosen to set the crank angle at which the contents of the smaller cylinder enter the combustion chamber to initiate the ignition and combustion process.

(d) The combustion chamber communicates with the smaller cylinder by way of an aperture which restricts the flow of gas into the smaller cylinder during the induction stroke, thus affecting the pressure in the smaller cylinder at the commencement of the compression stroke in order to retain the pressure there at a lower value than the pressure there at a lower value than the pressure in the larger cylinder.

The present invention is further described hereinafter, by way of example, with reference to the accompanying drawings, in which.

Referring now to the drawings, these show sections through a portion of preferred forms of internal combustion engine according to the present invention. For a better understanding and a complete description of the engine and its operation reference should be made to prior UK patents number 2 155 546 and 2 186 913 and pending application no 2218153. The same reference numbers as are used in the aforementioned prior specifications are used in the accompanying drawings to identify like parts.

Figure 1:
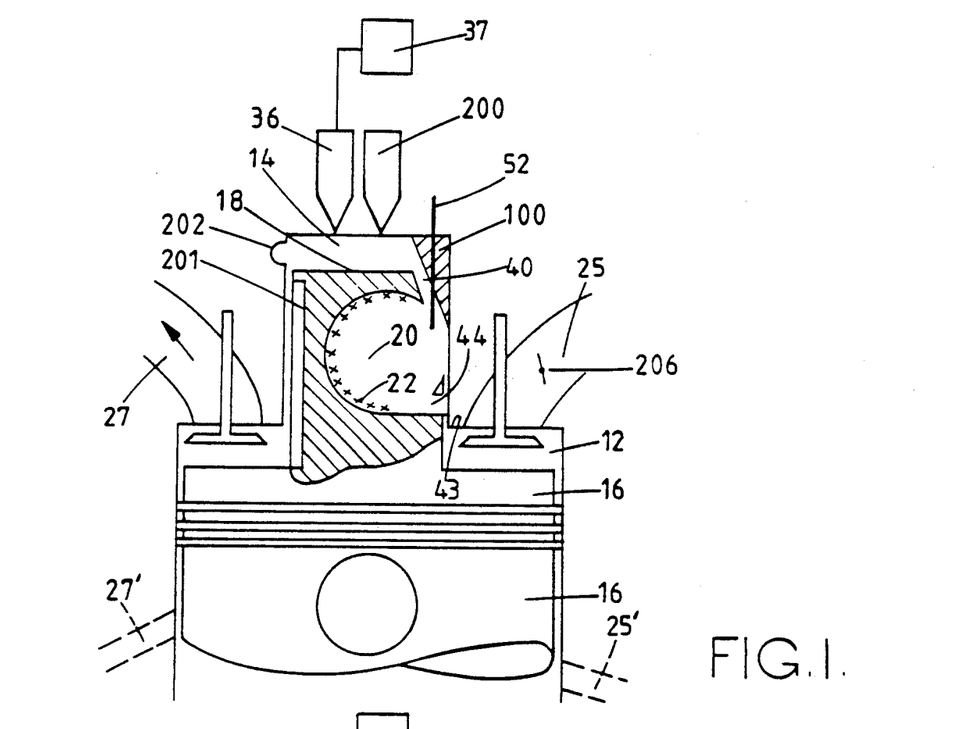
FIG. 1 is a partial section through a portion of a first embodiment of an internal combustion engine according to the present invention.

The engine of FIG. 1 has one or more pairs of cooperating first and second cylinders 12, 14 containing respective first and second pistons 16, 18. The cylinders 12, 14 are interconnected by a combustion chamber 20 The two cylinders are formed by a larger cylinder 12 which has a cylindrical extension forming a smaller cylinder 14. The larger cylinder has a larger swept volume than the smaller cylinder. The axes of the two cylinders are parallel and although cylinder 14 is shown coaxial with the larger cylinder 12 it can be in any suitable position. The larger cylinder 12 is provided with a first piston 16 which also, on its crown, carried a cylindrical extension projecting into the smaller cylinder 14 and forming the piston 18 for the smaller cylinder. The stroke of the first piston 16 is arranged such that the second piston 18 projects into the cylinder 14 even at its outer dead centre position.

Both cylinders 12, 14 communicate with the combustion chamber 20 through respective apertures 40, 44. The combustion chamber is preferably spherical or spheroidal, although other suitable shapes may be used and is provided with suitable ignition means 22 as described below. Fuel is introduced into the smaller cylinder 14 by means of a fuel injector 36 controlled by a control means 37 whilst air is inducted into the larger cylinder through an inlet port 25. The air inducted into the larger cylinder is preferably unthrottled, that is it is not controlled by means such as a butterfly valve as is the case with known gasoline engines. An exhaust port 27 is provided in the larger cylinder 12. An as alternative, exhaust and air inlet 27', 25' ports may open into the larger cylinder 14 as shown in dotted lines. The ports may be opened and closed by valves such as poppet valves or by the piston 16 itself when the ports are in the side walls of the cylinder 12.

The combustion chamber 20 is actually formed inside the second piston 18 although it may also be formed in the engine cylinder block. The second piston 18 may be operated without piston rings since air will only leak from the larger cylinder 12 to the smaller cylinder 14 whilst there is a small pressure difference between the two cylinders.

The smaller cylinder 14 is also provided with a protrusion 100 to displace most of the volume in aperture 40, when at or near IDC. The protrusion is positioned to reduce aperture 40 as the piston 18 approaches IDC. This is described below in more detail.

The combustion chamber in each of the described embodiments contains a continuous ignition means, i.e. an ignition means which is continuously operable. The phrase "continuously operable" as used herein with reference to the ignition means refers to a type of ignition means which is active or capable of being activated over the whole of the engine cycle or over a preselected time period which is a substantial portion (e.g. greater than 25%) of the time period required for completion of one revolution of the engine. The following forms of ignition means may be used.

(1) Part or all of the wall of the combustion chamber may be formed by or covered with a ceramic material which, being a thermal insulator, reaches a very high temperature during the operation of the engine to form a hot surface ignition means. The fuel/air mixture ignites on contact with the hot ceramic surface.

(2) As an alternative to the ceramic material part or all of the combustion chamber wall may be a metal wall which, during operation of the engine, can also reach temperatures suitable for ignition.

(3) The ignition means may be in the form of a catalytic material which can initiate the oxidation of the fuel at a lower temperature than it otherwise requires for ignition in the absence of such a catalytic material. The catalyst is typically platinum, palladium or Rhodium or a combination of any of these preferably in the form of a film or coating on part or all of the internal wall or walls of the combustion chamber.

(4) A combination of any of the above may be used. In a preferred form of ignition means catalytic material is deposited on an effective thermal insulator such as a ceramic material of low thermal conductivity (e.g. Zirconia). The ceramic material is of sufficient thickness to reduce the temperature gradient from the surface of the combustion chamber into the underlying material. This ensures that the surface temperature of the combustion chamber rises rapidly to assist ignition.

Ignition may also be by way of compression ignition, in which the hot gases filling the combustion chamber spontaneously ignite the fuel at the end of the compression stroke with or without the aid of the above-mentioned ignition means. It will be appreciated that the phrase "continuously operable ignition means" also applied to compression ignition with or without the aid of other, above-mentioned ignition means.

During an induction stroke air is inducted into the larger cylinder 12 through the inlet port and some of the inducted air is drawn into the small cylinder 14 through the combustion chamber. Fuel is also injected or introduced into the cylinder 14 over a preselected angle (length) of movement of the piston.

Fuel is introduced into the smaller cylinder sufficiently prior to IDC at the end of the compression stroke to enable a substantial portion of the fuel to vaporise before the second piston reaches IDC. The range of movement of the second piston within which commencement of injection takes place may be from IDC of the piston at commencement of the induction stroke to approximately 10° angle of movement before IDC at the end of the compression stroke. The preferred range over which commencement of injection takes place is from IDC at the commencement of induction stroke to the point at which the piston has completed 90% (equivalent to an angle of movement of about 144°) of its compression stroke length. The injection of fuel ends no later than IDC at the end of the compression stroke. Fuel injection may take place at any time within this range over the preselected angle but is ideally injected as early as possible in the induction stroke to allow as much time as possible for the fuel to vaporise. In the preferred form of the invention the injection of fuel is commenced immediately after commencement of the induction stroke.

After reaching ODC both pistons begin the compression stroke. During most of the compression stroke air and/or gas in cylinder 12 moves through the combustion chamber 20 into cylinder 14 via apertures 44 and 40. Fuel is injected into the smaller cylinder 14 during the induction and compression strokes and the movement of the air and/or gas into cylinder 14 through aperture 40, effectively excludes the fuel in cylinder 14 from entering the combustion chamber 20 during this time. The engine relies on a change of direction of the gas movement between the larger and smaller cylinders 12, 14 during the compression stroke, and near the end of the compression stroke the gas flow reverses and the contents of cylinder 14 which include the fuel, can enter the combustion chamber 20 for ignition by the catalyst 22. This process is terms "ingression". The crank-angle position at which this happens, or point of ingression, determines the onset of ignition.

Where a catalyst or hot surface is used as the ignition means combustion is initiated at the catalysed or hot surface on contact of the fuel/air mixture with the surface. Since the fuel/air mixture forced into the combustion chamber from the smaller cylinder 14 is wholly or partially vaporised there is no delay in ignition unlike the diesel engine where the fuel is injected near IDC in the form of fuel droplets which first have to mix with the air in the combustion chamber and must then be heated up and vaporised before they can burn.

In the present invention, although the fuel is introduced into the combustion chamber in a concentrated form (a process known as stratification) because the fuel has previously been introduced into the smaller cylinder 14 it is at least partially vaporised when introduced into the combustion chamber, thus reducing ignition delay. The air inlet aperture 44 opens into the combustion chamber 20 in a direction tangential to the chamber such that the air which enters the combustion chamber has a tangential component of velocity. This creates a vortex motion in the chamber such that when fuel/air mixture is introduced through the aperture 40 this is "smeared" onto the combustion chamber wall for ignition over a relatively large surface area of the combustion chamber wall. Combustion raises the temperature and promotes the ignition of the remaining gases. Once combustion begins the chemical reaction taking place requires extra oxygen in order to proceed and this results from an enhanced mixing motion. With catalytic or hot surface ignition the fuel is ignited on a surface of the combustion chamber and the burning fuel causes the gases to expand and move radially inwardly where a strong interaction with the airflow in the chamber creates a powerful mixing action. The flame front is understood to move radially inwardly of the combustion chamber, causing combustion of the remaining fuel/air mixture.

The swirling vortex motion in the combustion chamber continues during the ignition period and ensures a prolonged contact with the catalyst or hot surface over a period of time to promote a rapid and complete combustion. Both pistons are then driven away from IDC allowing the burnt gases to expand and deliver work through the pistons to the engine crank shaft or crank shafts.

An aid to starting is also provided in the cylinder 14, the aid conveniently being a spark plug 52 or glow plug mounted in a protrusion 100 in the wall of the small cylinder 14.

The protrusion itself ensures that the fuel/air mixture in the small cylinder 14 is transferred into the combustion chamber 20 when piston 18 moves towards IDC and not left in the aperture. The protrusion itself ensures that the fuel/air mixture in the small cylinder 14 is transferred into the combustion chamber 20 when piston 18 moves towards IDC. The protrusion enters into aperture 40 as piston 18 approaches IDC so that fuel/air mixture trapped between the head of piston 18 and the facing end wall of cylinder 14 is forced through the narrower portion of the aperture 40 into the combustion chamber. This also increases the speed of the fuel/air mixture.

During starting, fuel is injected into the cylinder 14 by the fuel injector 36 which is controlled either electrically or mechanically by the operator of the engine. For starting, the fuel injector delivers a pre-set amount of fuel into the cylinder 14 which is just enough to make the fuel/air mixture in the cylinder 14 chemically correct (stoichiometric) or nearly so as to make it ignitable by a spark. As the volume of cylinder 14 is smaller than that of the cylinder 12, this amount of fuel represents a fraction of the full power which can be developed by the engine when fuelled to use all of the oxygen in both cylinders.

The spark plug 52 is energised to generate a spark when it enters the combustion chamber 20 to ignite the fuel/air mixture as it passes from the cylinder 14 into the combustion chamber 20. After a number of combustion cycles the continuous ignition means in the combustion chamber becomes active and energising of the spark plug need no longer take place.

A glow plug may be used instead of a spark plug for assisting starting. A "hot spot" is created which assists in vaporising fuel in the cylinder 14 and raising its temperature prior to entry into the combustion chamber 20. The hot plug can either protrude from the protrusion 100 or it can heat the surface of the protrusion from within.

It can be appreciated that the air aperture 44 connecting the combustion chamber 20 with the larger cylinder 12 can contain an appreciable air mass as the end of the compression stroke. This air mass may not take part in the combustion process which occurs inside the combustion chamber.

Figure 6A:
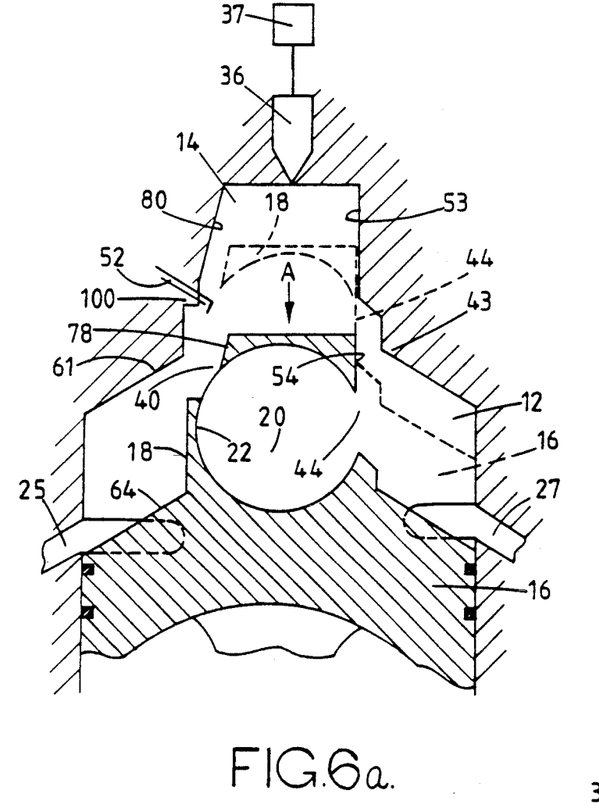
Figure 6B:
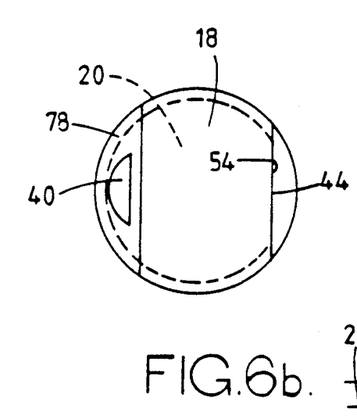

The embodiment shown in FIG. 6 of the drawings enables the displacement of most of the air in the aperture 44 into the combustion chamber at or near the end of the compression stroke. The smaller cylinder 14 has a protrusion 53 formed on its inner side wall. The protrusion is in the shape of a segment of the circular cross-section of the cylinder 14 but may be of any suitable shape. The portion of the side wall of the piston 18 through which the aperture 44 opens is correspondingly shaped to match that of the protrusion 53 and in this case the wall portion 54 of the piston 18 is planar.

The crown of the piston 16 between its side wall and the piston 18 is, in FIG. 6a, of frusto-conical shape with the end wall of the cylinder 12 correspondingly shaped. Thus, as is shown in dotted lines in FIG. 6a, as the pistons 16, 18 approach their top dead centre the aperture 44 is reduced by the protrusion 53 until it is finally closed when the pistons reach top dead centre.

There are several ways of controlling the point of ingression and hence the ignition timing.

Compressed gas may be injected by an injector 200 into the smaller cylinder 14 during the segregation period (i.e. any time during the induction and compression strokes). The compressed gas may be without fuel (e.g. compressed air) or with fuel (e.g. Butane or Propane in gaseous form) or a combination of the two, so that a proportion of the fuel may be introduced in this way. It could also be by liquid fuel injection assisted with a blast of air or other compressed gas. The timing of the introduction of such gas into cylinder 14 may be chosen precisely, late in the compression stroke, so as to induce ingression directly, in which case the quantity of gas injected becomes less critical.

Alternatively the timing of the introduction of such gas can be earlier in the segregation period if the quantity of gas is accurately controlled. The effect of the gas introduction is to raise the pressure in the smaller cylinder 14 in relation to the pressure in cylinder 12, so as to advance the point of ingression, and this allows external control means.

Partial throttling of the air inlet 25 to the larger cylinder 12 has the opposite effect, i.e. of delaying the point of ingression and may also be used as an external control of the point of ignition.

A throttle 206 is only capable of producing modest lowering of the induction pressure in cylinder 12.

The position, size and shape of aperture 44 can also affect the onset of ingression. For example, if the lower edge of the aperture 44 is raised, relative to the crown of the larger piston 16, access of air from cylinder 12 into the combustion chamber 20 through the aperture 44 near the end of the compression stroke is denied forcing the air to move through the clearance between the smaller piston 18 and the walls of the cylinder 14. This transfers air into the small cylinder 14 thus advancing the point of ingression. An added advantage of raising the lower edge of the aperture 44 is to force burning gas into the cylinder 14 during the initial stages of combustion before it enters the cylinder 12 and in so doing to involve fuel remaining in the cylinder 14 in the combustion process.

The point of ingression may also be advanced by using an "external passage" 205 or (FIG. 2) connecting cylinder 12 to cylinder 14 as a by-pass to allow external control.

Another possibility is to provide a passage between cylinder 14 and cylinder 12 which only opens up near the end of the compression stroke. This can be effected by an axial groove 201 (FIG. 1) formed in the outer curved wall of the smaller piston 18 and terminating below the crown of the piston. A depression or cut-out 202 in the wall of cylinder 14 bridges the edge of the piston crown above the groove 201 when the piston 18 reaches the latter part of the compression stroke and aperture 44 is blanked out. This allows the gases trapped in cylinder 12 to move into the small cylinder 14 through groove 201 and cut-out 202 when the aperture 44 closes as the piston 18 is reaching the end of the compression stroke.

The cut-out 202 may be a circumferential groove in the cylinder wall cooperating with a number of substantially axial grooves in the radially outer wall of piston 18.

A further possibility is to provide a small hole or holes 203 (FIG. 2) in piston 18 interconnecting the cylinders 12 and 14 which can provide continuous communication between the two cylinders in addition to clearance between the wall of cylinder 14 and piston 18.

The shape of the aperture 44 can also influence the point of ingression. The rate of change of flow area for a given unit of piston movement will influence the pressure bias described above in relation to the position, size and shape of the aperture 44.

The rate of change of flow area for a given unit of piston movement, of aperture 40, when it engages with the protrusion 100 will also influence the point of ingression.

Figure 2:
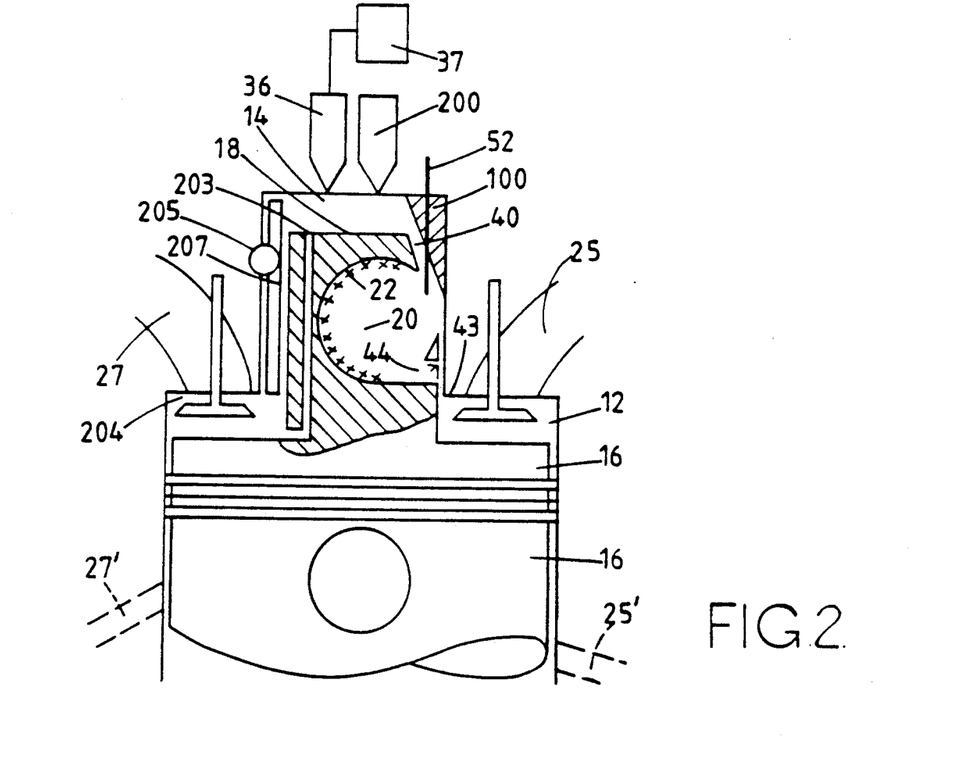
FIGS. 2 to 4, 5a, 5b, 6a, 6b, 7, 8a and 8b are views similar to that of FIG. 1 of further embodiments of an internal combustion engine according to the present invention.

As shown in FIG. 2, advantageously the flame plate 204 and the larger piston crown, apertures 44 and 40, part of the radially outer surface of the smaller piston 18 and the valve heads (but excluding the crown of the smaller piston 18) may be coated with a thermally insulating layer, such as ceramic, whose free surface has a deposit of a catalyst such as platinum or palladium. This assists in reducing noxious exhaust emissions.

FIGS. 3 to 6 illustrate preferred forms of a two stroke engine according to the present invention. These embodiments are similar to those of FIGS. 1 and 2 but here the inlet and outlet ports 25, 27 are cut in the wall of the larger cylinder 12, conveniently 180 degrees apart. The exhaust port 27 is in a position slightly higher than the inlet port 25.

When the edge of the piston 16 uncovers the inlet port 25 towards the end of the power stroke, fresh air is supplied to the cylinder 12, the air having being compressed either in the crank case of the engine, below the piston or in a separate compression chamber below the piston or by an external blower or compressor, in the usual way. Since the exhaust port 27 is uncovered first by the piston 16 exhaust gases in the cylinders 12, 14 are exhausted through port 27 as the fresh air entered the cylinder 12, the process being known as scavenging. Effective scavenging allows the replacement of most of the residual exhaust gases by fresh air, although leaving a small proportion of residual gases for promoting a reduction of exhaust emission of nitrogen oxides.

In the illustrated piston/cylinder arrangement there is a need to promote the movement of fresh air into the smaller cylinder 14 during the scavenging process and also into the combustion chamber 20 to replace residual, partially or fully burned gases. Several ways of achieving this are shown in the embodiments of FIGS. 3 to 6.

Figure 3:
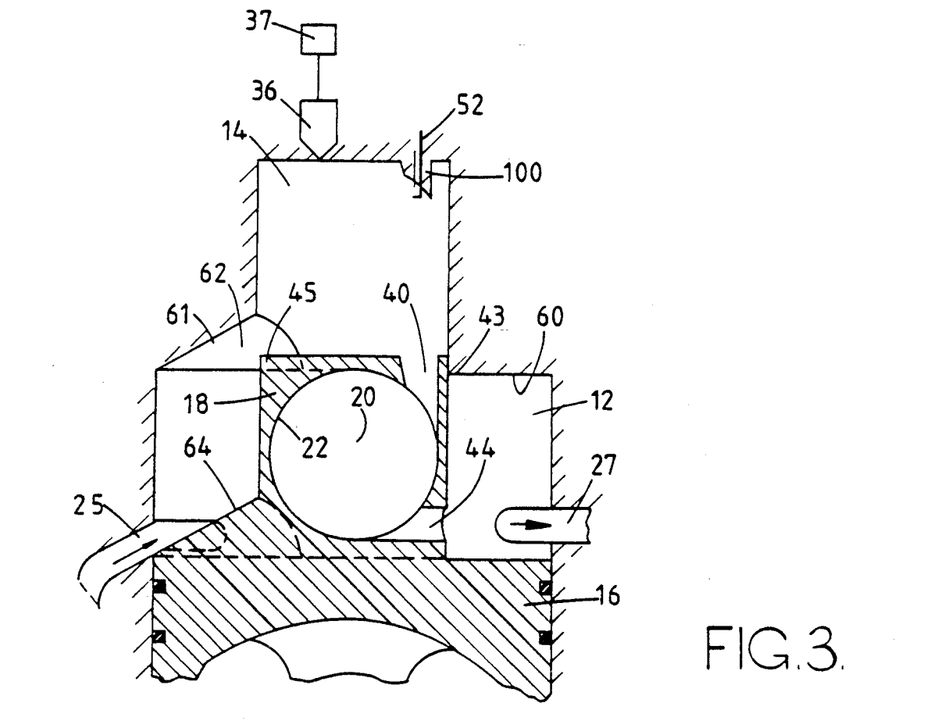

Referring to FIG. 3, the upper end wall 60 of the larger cylinder 12 has a cavity 62 formed therein to provide a passage between the cylinders 12, 14 when the pistons are at or near their outer dead centre position. The cavity 62 may be of any suitable shape and extends over any suitable angle around the piston 18. Preferably, the cavity extends over an angle in the range substantially 10 degrees to 180 degrees around the piston 18.

The crown of the piston 16 is provided with a protrusion 64 which is shaped to correspond with that of the cavity 62 so that when the pistons 16, 18 reach their top dead centre position the cavity 62 is substantially filled by the protrusion 64. This minimises the volume between the crown of the piston 16 and the upper end wall of the cylinder 12 at the end of the compression stroke to minimise the parasitic volume containing air which does not take part in the combustion process.

The arrangement of FIG. 3 allows scavenging of both the smaller cylinder 14 and the combustion chamber 20 since fresh air flows from the inlet port 25 through the cavity 62, the smaller cylinder 14 and the combustion chamber 20, out of the aperture 44 and then the exhaust port 27.

Figure 4:
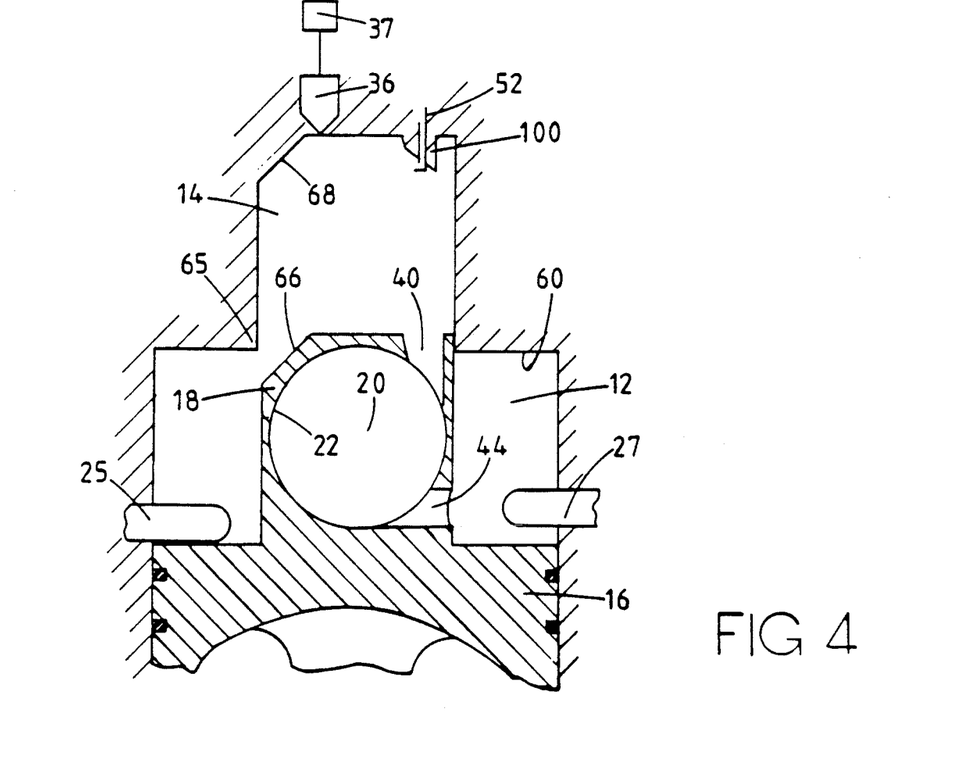

In FIG. 4 a portion of the smaller piston 18 at the junction of its crown and side wall has been removed to provide a recess 66 which again creates a passage between the larger cylinder 12 and the smaller cylinder 14 when the pistons are at or near their bottom dead centre position. The recess 66 may be of any suitable shape such as flat or curved and may extend over an arc round the piston 18 over an angle of between substantially 10 degrees and 180 degrees.

A correspondingly shaped protrusion 68 is provided at the juncture of the side and end walls of the smaller cylinder 14 such that when the pistons are at their top dead centre position the parasitic volume is reduced to a minium. The scavenging path here is the same as in the embodiment of FIG. 3.

Figure 5A:
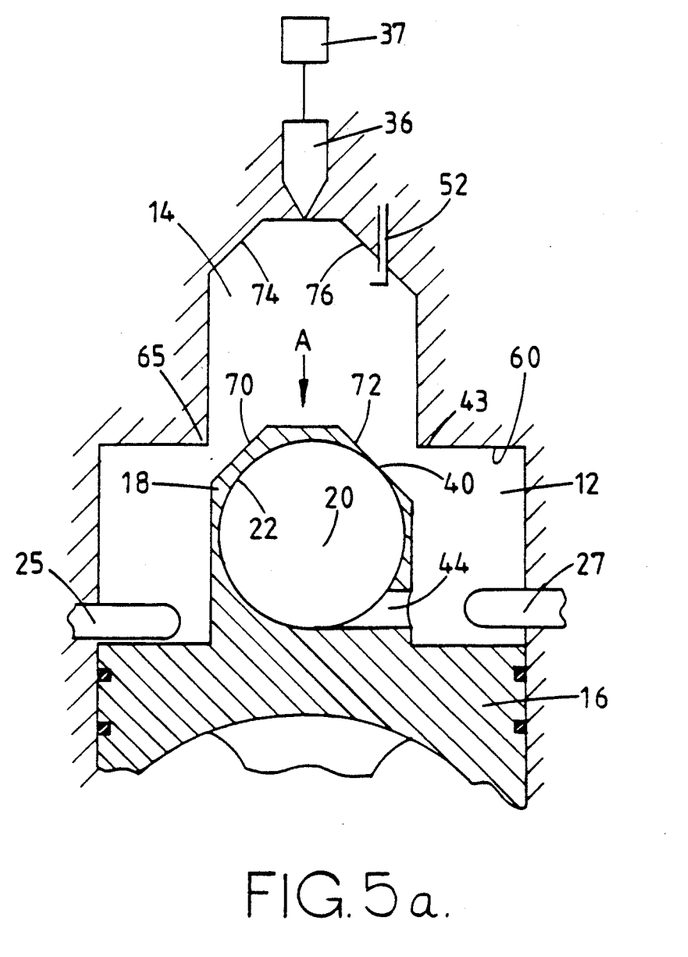
Figure 5B:
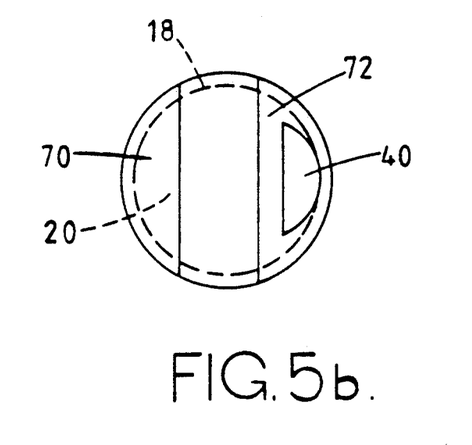

Referring now to FIGS. 5a and 5b two cavities 70, 72 similar to the cavity 66 of FIG. 4, are formed in the smaller piston 18. The exhaust ports 25 and 27 extend over pre-selected arcs in the larger cylinder 12, being typically 60 degrees for each port, and the cavities 70 and 72 face the respective inlet and outlet ports 25, 27 or partially overlap the arcs over which these ports extend. The inlet and exhaust ports shown in the other embodiments described herein also conveniently extend over similar arcs.

Two correspondingly shaped protrusions 74, 76 are formed at the juncture of the side and end walls of the cylinder 14, these protrusions meeting with the cavities 70, 72 when the pistons are at their top dead centre position in order to minimise the parasitic volume. In this arrangement fresh air from the inlet port 25 can take two simultaneous paths, one through the combustion chamber 20 as previously described and another more direct route from the smaller cylinder 14 to the larger cylinder 12 and the exhaust port 27.

Each of the cavities 70, 72 occupies an arc on the crown of the piston 18 of less than 180- degrees as can be seen from FIG. 5b. This is necessary to leave a full diameter portion on the crown of the piston 18 to retain engagement in the cylinder 14 when the pistons reach their bottom dead centre position.

Referring again to FIGS. 6a and 6b in this arrangement the aperture 40 opens into a recess 78 provided at the juncture of the side wall and crown of the piston 18. A cooperating protrusion 80 is provided on the side wall of the cylinder 14 to fill the recess 78 when the pistons are at their top dead centre position. The recess 78 and protrusion 80 again may be of any suitable shape and may extend over an arc of between 10 and 180 degrees.

Protrusion 53 and recess 54 are also provided at or adjacent the aperture 44 as previously described.

The arrangement allows scavenging air from the inlet port 25 to flow directly through the combustion chamber 20 and out the exhaust port 27 as well as through the cylinder 14.

A relatively large uninterrupted periphery for the crown of piston 18 is also provided to ensure proper engagement in the smaller cylinder 14 when the piston is at its bottom dead centre position.

The surface of the larger piston 16 may be flat or frusto-conical as shown in FIG. 6a or any other suitable shape. A conical or inclined surface has the advantage of directing the scavenging air upwards from the inlet port 25 towards the smaller cylinder 14 and combustion chamber 20. In addition, the shape of the crown of the larger piston 16 may be chosen to promote a slight rotation of the scavenging air either alone or in combination with assistance from the direction of the inlet port 25.

It is to be noted that because of the direction of air flow during the compression stroke, the smaller piston 18 does not require piston rings to seal it against the bore of the cylinder 18 and this allows the formation of cavities in the side wall of the piston 18.

Figure 7:
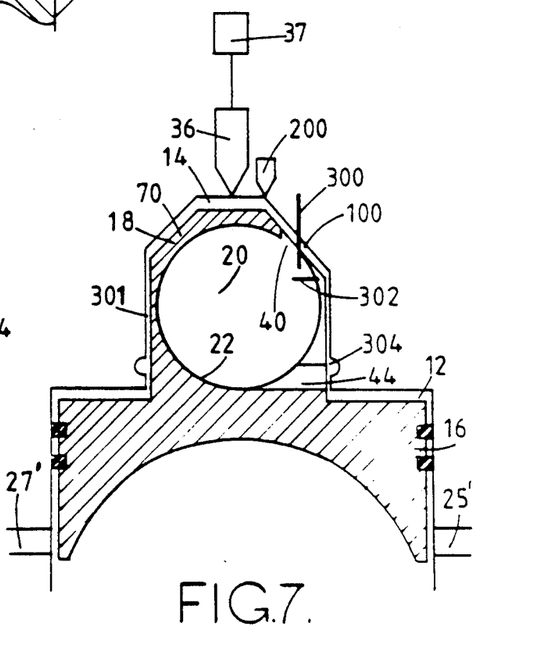

Referring now to FIG. 7 this shows a further form of engine in which an aid to starting is provided. An electrode 300 is mounted in a protrusion 100 in the wall of the small cylinder 14. A second electrode 302 is provided inside the combustion chamber 20 adjacent the aperture 40 so that as the piston 18 approaches its top dead centre position the electrodes approach one another until the gap between the two electrodes is at a preselected minimum. The electrode 302 is earthed whilst a high voltage is applied to electrode 300 such that the voltage across the gap between the two electrodes at top dead centre is large enough to generate sparks across the electrodes.

As is previously mentioned, the fuel injector 36 delivers a preset amount of fuel into the cylinder which is just enough to make the fuel/air mixture chemically correct or nearly so as to make it ignitable by a spark.

After a few combustion cycles the ignition means in the combustion chamber takes over the ignition process and the voltage supply to the electrode 300 can be discontinued.

The arrangement does not require a distributor system to switch voltage between cylinders or to apply voltage to the electrode 300 at a specified time during the engine cycle. The voltage applied to the electrode 300 may be derived from a capacitor which is repetitively charged during operation of the engine.

As the pistons move towards top dead centre position the fuel/air mixture in the smaller cylinder 14, which includes vaporised fuel, begins to enter the combustion chamber 20 through aperture 40. The fuel thus entering the chamber is ignited by the continuous ignition means 22 (Typically a catalyst) on the wall of the combustion chamber and this ignition results in a rise in pressure in the combustion chamber. This rise in pressure will tend to oppose the entry of further fuel/air mixture from cylinder 14 into the combustion chamber until the pressure in cylinder 14 again rises above the pressure in the combustion chamber. There may also be a tendency for the increase in pressure in cylinder 14 to cause fuel/air mixture to leak past the piston 18 into the cylinder 12.

In order to prevent such leakage the air aperture 44 is positioned a preselected distance above the crown of the piston 16 so that the aperture 44 is cut off by the side wall of the cylinder 14 before the pistons reach their top dead centre position.

A recess 304 is provided in the side wall of the cylinder 14 and is positioned such that it communicates with the aperture 44 when the latter is cut off from the cylinder 12. The recess 304 partially or completely overlaps the aperture 44 and is conveniently in the form of a groove which extends along part or all of the circumference of the wall of the cylinder 14.

As the pistons approach their top dead centre position and the aperture 44 is cut off from the cylinder 12, the pressure of the remaining air in the cylinder 12 increases rapidly. In addition, during ignition of the fuel/air mixture in the combustion chamber 20 the pressure in the aperture 44, and therefore in the recess 304 also increases rapidly. Initially, as the pressure in the combustion chamber opposes the introduction of further fuel/air mixture from the cylinder 14, the increased pressure in the aperture 44 and the recess 304 also resists leakage of fuel/air mixture from the cylinder 14, between the side walls of the piston 18 and cylinder 14.

As the pressure in the cylinder 14 rises above the pressure in the combustion chamber 20, the rapidly increasing pressure of air in the cylinder 12, after the aperture 44 has been cut off from the cylinder 12, also serves to prevent any leakage of fuel/air mixture into the cylinder 12.

Figure 8A:
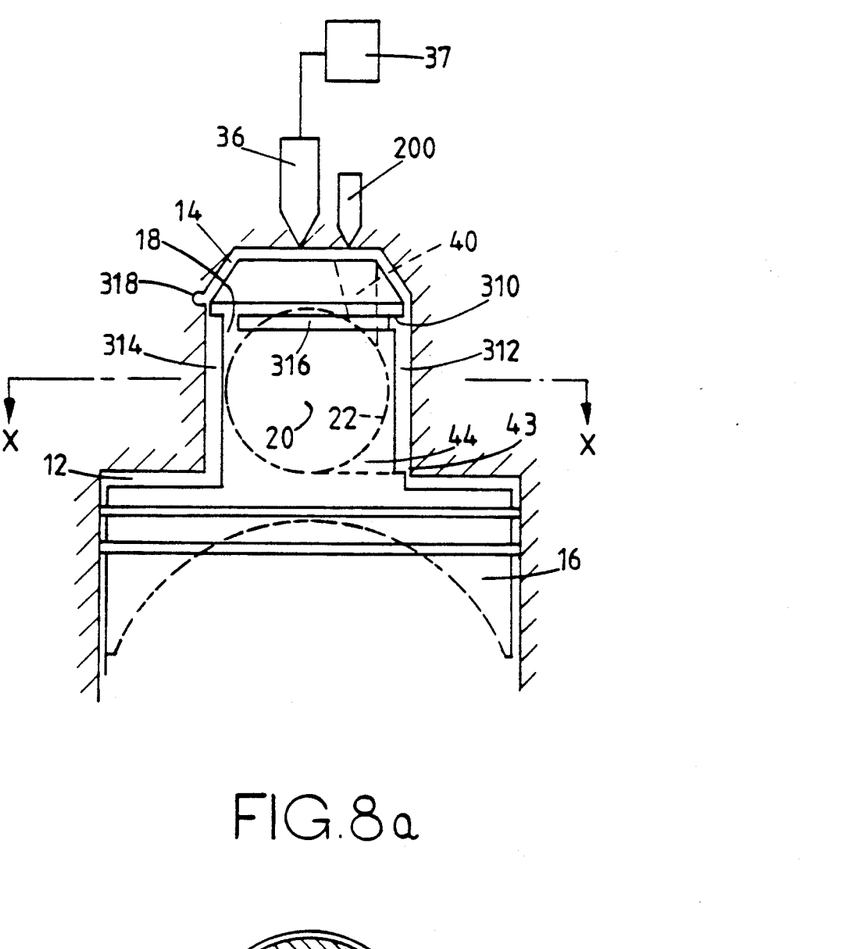
Figure 8B:
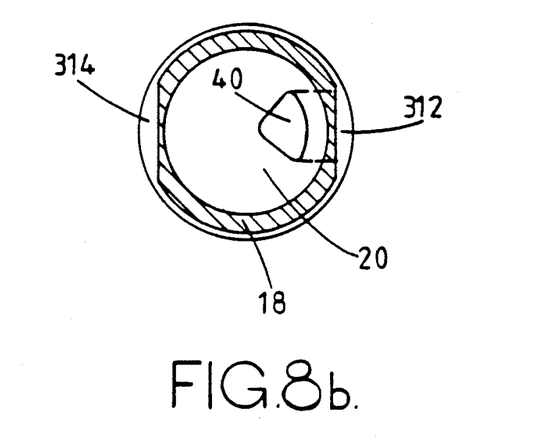

Referring now to FIG. 8, the piston 18 is provided with a frusto-conical crown which overlies the body of the piston to provide a shoulder 310 which seals the space above the piston 18 from the cylinder 12. The term "seals" as used herein is used in the sense that the gap between the shoulder or other "seal" such as the piston side wall as may be used in other embodiments, is large enough to allow free movement of the piston 18 in the cylinder 14 but small enough to restrict flow of gases from cylinder 14 past piston 18 to cylinder 12 to a minimum. The upper end wall of the cylinder 14 is correspondingly shaped.

The side wall of the piston 18 beneath the shoulder 310 is provided with two diametrically opposed cavities 312, 314 which are conveniently segment-shaped but may be of any suitable shape. The cavity 314 extends from the crown of piston 16 to the shoulder 310 whilst the cavity 312 extends from the aperture 44 to the shoulder 310. As with the aperture 44 of FIG. 7, the aperture here is also positioned a preselected height above the crown of piston 16. The cavity 312 opens into a peripheral groove 316 which is formed in the piston 18 below the shoulder 310. The groove does not extend the full periphery of the piston 18 and does not open in to the cavity 314. At the shoulder 310 the piston has a cylindrical portion which extends the full circumference of the piston to cooperate with the side wall of the cylinder 14 to provide a seal between the cylinders 14 and 12.

The aperture 40 from the combustion from the combustion chamber opens into the uppermost surface of the piston 18.

In a similar manner to the embodiment of FIG. 7, as combustion begins in the combustion chamber 20 the pressure in the chamber increases and this pressure is transferred through aperture 44 to the cavity 312 and groove 316 to inhibit leakage across the cylindrical portion of piston 18.

The cavity 314 also has a cooperating recess or groove 318 formed in the sidewall of the cylinder 14. This groove 318 extends angularly for part or all of the angular length of the cavity 314.

Towards the end of the compression stroke as the air aperture 44 is cut off from the cylinder 12 the pressure rise in the combustion chamber caused by the influx or air from cylinder 12 ceases, whilst the pressure in cylinder 14 continues to rise as piston 18 moves towards its top dead centre position. As a result, fuel/air mixture from cylinder 14 begins to enter the combustion chamber through the aperture 40.

When the air aperture 44 is cut off from the cylinder 12 the air trapped above piston 16 in the "squish space" is allowed to flow into the cavity 314. The cavity 318 is positioned such that as the pistons approach their inner dead centre position the cylindrical sealing portion of the cylinder 18 is bridged by the cavity 318 to allow the air that is forced into cavity 314 from cylinder 12 to flow around the cylindrical ceiling portion of cylinder 18 into the cylinder 14 above the piston 18. This further increases the pressure of fuel/air mixture in cylinder 14, assisting the movement of fuel/air mixture through aperture 40 into the combustion chamber 20. The cavity 318 may be formed by one or more interconnected grooves.

After ignition at inner dead centre, gas pressure in cylinder 14 may cause some leakage from the space above piston 18 through the squish air passage groove 318 but this leakage will be of short duration and only involve air, without fuel, which has previously passed through passages 314 and 318 prior to ignition.

Although the embodiment of FIG. 8A shows the cavities 314, 318 formed in the same piston/cylinder unit as cavities 312, 316 these may be provided independently of one another in such a piston/cylinder unit.

It should also be noted that any feature disclosed with reference any one of the illustrated embodiments may be used in combination with any other feature of any of the embodiments, where possible.

I claim:

1. An internal combustion engine comprising
first and second cylinders, said first cylinder having a larger swept volume than said second cylinder and said second cylinder being formed in the crown of said first cylinder;
first and second pistons reciprocable respectively in said first and second cylinders, said second piston being formed as a protrusion on the crown of said first piston;
a combustion chamber;
a first port for enabling communication between said first cylinder and said combustion chamber;
a second port for enabling communication between said second cylinder and said combustion chamber;
first means for supplying air or the like into said first cylinder during an induction stroke of said first piston;
second means for supplying fuel to said second cylinder;
and means for enabling transfer of air from said first cylinder to said second cylinder other than through said combustion chamber over a preselected angle of movement of the pistons relative to the cylinders for assisting movement of gases from said second cylinder into said combustion chamber.

2. An engine as claimed in claim 1 having continuously operable ignition means in said combustion chamber.

3. An engine as claimed in claim 2 wherein said engine is a two-stroke engine, and said enabling means comprises passageway means extending between said first and second cylinders said passageway means being open over a preselected angle of movement of said pistons through their outer dead centre position for enabling scavenging of exhaust gases through said second cylinder.

4. An engine as claimed in claim 3 wherein said passageway means is formed by cooperating edges formed on said second piston and at the juncture of said first and second cylinders for providing an opening between said first and second cylinders over said preselected angle of movement of said pistons.

5. An engine as claimed in claim 4 wherein said edge on said second piston is formed by a cut away portion of said piston at the juncture of the side wall and crown of the piston.

6. An engine as claimed in claim 5 wherein said edge at the juncture of said first and second cylinders is formed by a cut away portion of the cylinder wall.

7. An engine as claimed in claim 2 wherein said enabling means comprises passage means extending between said first and second cylinders and means controlling movement of air through said passage means between said first and second cylinders.

8. An engine as claimed in claim 7 wherein said controlling means comprises means for closing said first port to said first cylinder over a preselected angle of movement of said pistons relative to said cylinders through their inner dead centre position to cause air from said first cylinder to be forced through said passage means into said second cylinder to assist or initiate ingression into the combustion chamber of fuel/air mixture in said second cylinder.

9. An engine as claimed in claim 8 wherein said passage means comprises a small bore hole connecting said first and second cylinders.

10. An engine as claimed in claim 9 wherein said small bore hole is formed in said second piston and the ends of said bore open adjacent the crown of said first piston and into the crown of said second piston.

11. An engine as claimed in claim 8 wherein said closing means comprises a cooperating edge on one of said pistons and cylinders.

12. An engine as claimed in claim 11 wherein said combustion chamber is formed in said second piston, said first port opens in a side wall of said second piston at a preselected location therein axially spaced from the crown of said first piston and said edge is formed by a shoulder between said first and second cylinders.

13. An engine as claimed in claim 12 wherein said controlling means is operable to open said passage means over a preselected angle of movement through the inner dead centre position in a compression stroke of the pistons to enable air from said first cylinder to be forced into said second cylinder to assist or initiate ingression into the combustion chamber of fuel/air mixture in said second cylinder.

14. An engine as claimed in claim 13 wherein said passage means is formed between side walls of said second cylinder and said second piston and said controlling means comprises a sealing means on said second piston side wall adjacent the crown thereof for closing said passage means, and a cooperating recess formed in said second cylinder side wall at a preselected location so as to open said passage means into said second cylinder above said second piston over said preselected angle of movement of said second piston through its inner dead centre position.

15. An engine as claimed in claim 14 wherein said second piston has a part annular groove formed in the side wall of said second piston below said sealing means and circumferentially spaced from said first passage means, and second passage means connecting said groove with said first port for transferring pressure from said combustion chamber to said groove for inhibiting leakage of gases from said second cylinder to said first cylinder around said second piston during combustion.

16. An engine as claimed in claim 14 wherein said passage means is a clearance between the side walls of said second piston and cylinder.

17. An engine as claimed in claim 16 wherein said passage means is formed by an axially extending flattened portion on the side wall of said second piston.

18. An engine as claimed in claim 14 wherein said passage means comprises a longitudinally extending groove formed in said side wall of said second piston.

19. An engine as claimed in claim 18 wherein said passage means is formed in said side wall of said second piston and extends to a point adjacent the crown of said piston, said sealing means is formed by said piston between an upper end of said groove and said crown, and said recess is dimensioned so as to form a passage for air from said first cylinder through said passage means to said second cylinder over said preselected angle of movement.

20. An engine as claimed in claim 1 wherein said engine is a compression ignition engine.

21. An engine as claimed in claim 20 having continuously operable ignition means in said combustion chamber.

22. An engine as claimed claim 20 wherein said engine is a two-stroke engine, and said enabling means comprises passageway means extending between said first and second cylinders said passageway means being open over a preselected angle of movement of said pistons through their outer dead centre position for enabling scavenging of exhaust gases through said second cylinder.

23. An engine as claimed in claim 22 wherein said passageway means is formed by cooperating edges formed on said second piston and at the juncture of said first and second cylinders for providing an opening between said first and second cylinders over said preselected angle of movement of said pistons.

24. An engine as claimed in claim 23 wherein said edge at the juncture of said first and second cylinders is formed by a cut away portion of the cylinder wall.

25. An engine as claimed in claim 23 wherein said edge on said second piston is formed by a cut away portion of said piston at the juncture of the side wall and crown of the piston.

26. An engine as claimed in claim 25 wherein said edge at the juncture of said first and second cylinders is formed by a cut away portion of the cylinder wall.

27. An engine as claimed in claim 20 wherein said enabling means comprises passage means extending between said first and second cylinders and means controlling movement of air through said passage means between said first and second cylinders.

28. An engine as claimed in claim 27 wherein said controlling means comprises means for closing said first port to said first cylinder over a preselected angle of movement of said pistons relative to said cylinders through their inner dead centre position to cause air from said first cylinder to be forced through said passage means into said second cylinder to assist or initiate ingression into the combustion chamber of fuel/air mixture in said second cylinder.

29. An engine as claimed in claim 28 wherein said passage means comprises a small bore hole connecting said first and second cylinders.

30. An engine as claimed in claim 29 wherein said small bore hole is formed in said second piston and the ends of said bore open adjacent the crown of said first piston and into the crown of said second piston.

31. An engine as claimed in claim 28 wherein said closing means comprises a cooperating edge on one of said pistons and cylinders.

32. An engine as claimed in claim 31 wherein said combustion chamber is formed in said second piston, said first port opens in a side wall of said second piston at a preselected location therein axially spaced from the crown of said first piston and said edge is formed by a shoulder between said first and second cylinders.

33. An engine as claimed in claim 32 wherein said controlling means is operable to open said passage means over a preselected angle of movement through the inner dead centre position in a compression stroke of the pistons to enable air from said first cylinder to be forced into said second cylinder to assist or initiate ingression into the combustion chamber of fuel/air mixture in said second cylinder.

34. An engine as claimed in claim 33 wherein said passage means is formed between side walls of said second cylinder and said second piston and said controlling means comprises a sealing means on said second piston side wall adjacent the crown thereof for closing said passage means, and a cooperating recess formed in said second cylinder side wall at a preselected location so as to open said passage means into said second cylinder above said second piston over said preselected angle of movement of said second piston through its inner dead centre position.

35. An engine as claimed in claim 34 wherein said second piston has a part annular groove formed in the side wall of said second piston below said sealing means and circumferentially spaced from said first passage means, and second passage means connecting said groove with said first port for transferring pressure from said combustion chamber to said groove for inhibiting leakage of gases from said second cylinder to said first cylinder around said second piston during combustion.

36. An engine as claimed in claim 34 wherein said passage means is a clearance between the side walls of said second piston and cylinder.

37. An engine as claimed in claim 36 wherein said passage means is formed by an axially extending flattened portion on the side wall of said second piston.

38. An engine as claimed in claim 34 wherein said passage means comprises a longitudinally extending groove formed in said side wall of said second piston.

39. An engine as claimed in claim 38 wherein said passage means is formed in said side wall of said second piston and extends to a point adjacent the crown of said piston, said sealing means is formed by said piston between an upper end of said groove and said crown, and said recess is dimensioned so as to form a passage for air from said first cylinder through said passage means to said second cylinder over said preselected angle of movement.

* * * * *